United States Patent
Wu

(10) Patent No.: US 7,634,081 B2
(45) Date of Patent: Dec. 15, 2009

(54) METHOD FOR MANUFACTURING ELECTRONIC DEVICE PANEL AND STRUCTURE THEREOF

(75) Inventor: Che-Tung Wu, Taoyuan (TW)

(73) Assignee: Ichia Technologies, Inc., Taoyuan (TW)

( * ) Notice: Subject to any disclaimer, the term of this patent is extended or adjusted under 35 U.S.C. 154(b) by 432 days.

(21) Appl. No.: 11/762,853

(22) Filed: Jun. 14, 2007

(65) Prior Publication Data

US 2008/0247538 A1    Oct. 9, 2008

(30) Foreign Application Priority Data

Apr. 4, 2007   (TW) .............................. 96112043 A

(51) Int. Cl.
*H04M 1/00* (2006.01)
*H04M 9/00* (2006.01)

(52) U.S. Cl. .............................. 379/433.11; 379/433.07

(58) Field of Classification Search ................. 379/368, 379/433.06, 433.07, 422, 433.11; 361/679.01; 200/314, 341; 341/22; 455/575.1, 90.3
See application file for complete search history.

(56) References Cited

U.S. PATENT DOCUMENTS 5,439,545 A    8/1995   Nakanishi et al.
6,196,738 B1   3/2001   Shimizu et al.
7,099,465 B2   8/2006   Nishi

*Primary Examiner*—Tuan D Nguyen
(74) *Attorney, Agent, or Firm*—Chun-Ming Shih

(57) ABSTRACT

A method for manufacturing a panel having a surface of three-dimensional patterns and the structure thereof, first of all, provides a piece body, on the surface of which plane panel patterns are arranged by means of ink printing process, and which is thermally pressed into a plurality of projected three-dimensional panels. The piece body having projected three-dimensional panels is then placed between a lower mould and a first upper mould. A material of hard resin is injected into the clearance between the lower mould and the three-dimensional panel surfaces, and thus a transparent cladding layer capable of wear-resistance and protection for three-dimensional panels is formed. Next, material of hard resin is again injected into the space between the inner wall surfaces of the three-dimensional panels and a second upper mould for forming a supporting layer for supporting the three-dimensional panels. Afterwards, a material of rubber is injected into the space between a third upper mould and the inner wall surfaces of three-dimensional panels to form an elastic layer. At last, castings on the piece body and three molded layers are integrally cut according to respective contour to thus complete the manufacturing process of a single panel structure.

20 Claims, 19 Drawing Sheets

METHOD FOR MANUFACTURING ELECTRONIC DEVICE PANEL AND STRUCTURE THEREOF

BACKGROUND OF THE INVENTION

1. Field of the Invention

The present invention relates to a panel structure and, in particular, to a method for manufacturing an electronic device panel consisting of a housing and a keypad.

2. Description of Prior Art

Following the continuous progress of technology, various communication products are successively integrated together. For example, a combination of a mobile phone and a GPS (Global Positioning System) makes a consumer possess many functions to use simultaneously, when he buys only one communication product, so that a lot of purchasing cost may be saved.

However, when a general user is purchasing a mobile phone, except for the consideration of its function, he also considers other factors, such as: innovative appearance and modeling, and/or mini-size, etc. Therefore, colorful patterns or three-dimensional textures are directly arranged onto the panel of a mobile phone in current market, to induce the product's added value and purchased desire.

As shown in FIG. 1A to FIG. 1C, when a panel structure of a traditional mobile phone is produced, first of all, a plurality of plane patterns (or colorful patterns) 301 are printed onto the surface of a piece body 300 made of material of transparent PC (polycarbonate) film by means of ink printing process, then the panels with printed patterns 301 are thermally pressed into a three-dimensional housing 302 projecting out of the surface of the piece body 300 and, in the meantime, the panel patterns 301 are located at the inside of the three-dimensional panel housing 302, which is then cut into a single three-dimensional panel housing 302 that is again placed into a plastic injection mould, and interior of which is formed a layer of inner housing 303, after a plastic material is injected into the mould, whereby the printed panel patterns 301 are disposed between the piece body 302 and the inner housing 303 to make a protection body formed on the outer surface of the piece body 300, which may prevent the panel patterns 301 from being scraped by external objects.

However, although aforementioned panel structure may indeed prevent the panel patterns 301 from being damaged by external objects, it must consider whether the ink of the printed panel pattern 301 is eligible for being bent or is possessed of flexibility, when the three-dimensional panel housing 302 is undergone the thermally pressing process. If the ink itself does not possess flexibility then, when the piece body 300 is thermally pressed into a three-dimensional panel housing 302, the bending of the three-dimensional panel housing 302 will easily make the patterns that are printed by ink generate cracks, which will further incur the production of defective products and waste of material.

In addition, when the three-dimensional panel housing 302 to be injection molded with the plastic is placed into the mould, if the temperature of the plastic material injected into the mould is controlled inappropriately, the temperature will exceed the bearable temperature of the ink to deteriorate or damage the ink, which will in turn incur the production of defective products and waste of material.

Furthermore, when the three-dimensional panel 302 is placed into the plastic injection mould, since of no externally locating hole, its alignment requires special structure design to avoid position deviation after injection, so that the production yield can be promoted.

SUMMARY OF THE INVENTION

Therefore, the invention proposes an innovative manufacturing method for panel structure, making panel structure manufactured more easily, thereby the occurrence of defective product being lowered down.

To achieve above objective, in the manufacturing method for panel structure according to the present invention, first of all, a piece body is provided, and a plurality of plane panel patterns are printed by ink on the back surface of the piece body. The aforementioned printed panel patterns may be thermally pressed into a three-dimensional panel projecting out of the surface of the piece boy.

Secondly, a mould is provided, and the plural three-dimensional panels are placed into the mould. When the plural three-dimensional panels are placed into the mould, since of the change of the process, the formed three-dimensional panel may be aligned to the mould by means of externally locating holes, effectively avoiding the position deviation after injection and significantly enhancing the product yield. Next, material of hard resin mixed with material having excellent properties of wearing-resistance and scraping-endurance is injected into the clearance between the mould and the surface of the three-dimensional panel, whereby a transparent cladding layer capable of wearing-resistance and protection for the three-dimensional panel is formed. Furthermore, it is possible to form keys and texture lines on the cladding layer, or any kind of three-dimensional patterns, for example, character, numeral, and Braille, etc., may be formed on the keys, making the surfaces possess special effectiveness.

After being mixed with material of excellent impact-resistance, material of hard resin is injected into a gap between the inner wall surface of the three-dimensional panel and a second mould, forming a supporting layer for supporting the three-dimensional panel.

At last, material of rubber is injected into a space between the inner wall surface of the three-dimensional panel and a third mould to form an elastic layer. When the process for manufacturing the panel structure is completed, the castings are separated to form the structure of a single panel having a housing and a keypad.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

In cooperation with attached drawings, the technical contents and detailed description of the present invention will be as follows.

Figure 1A:
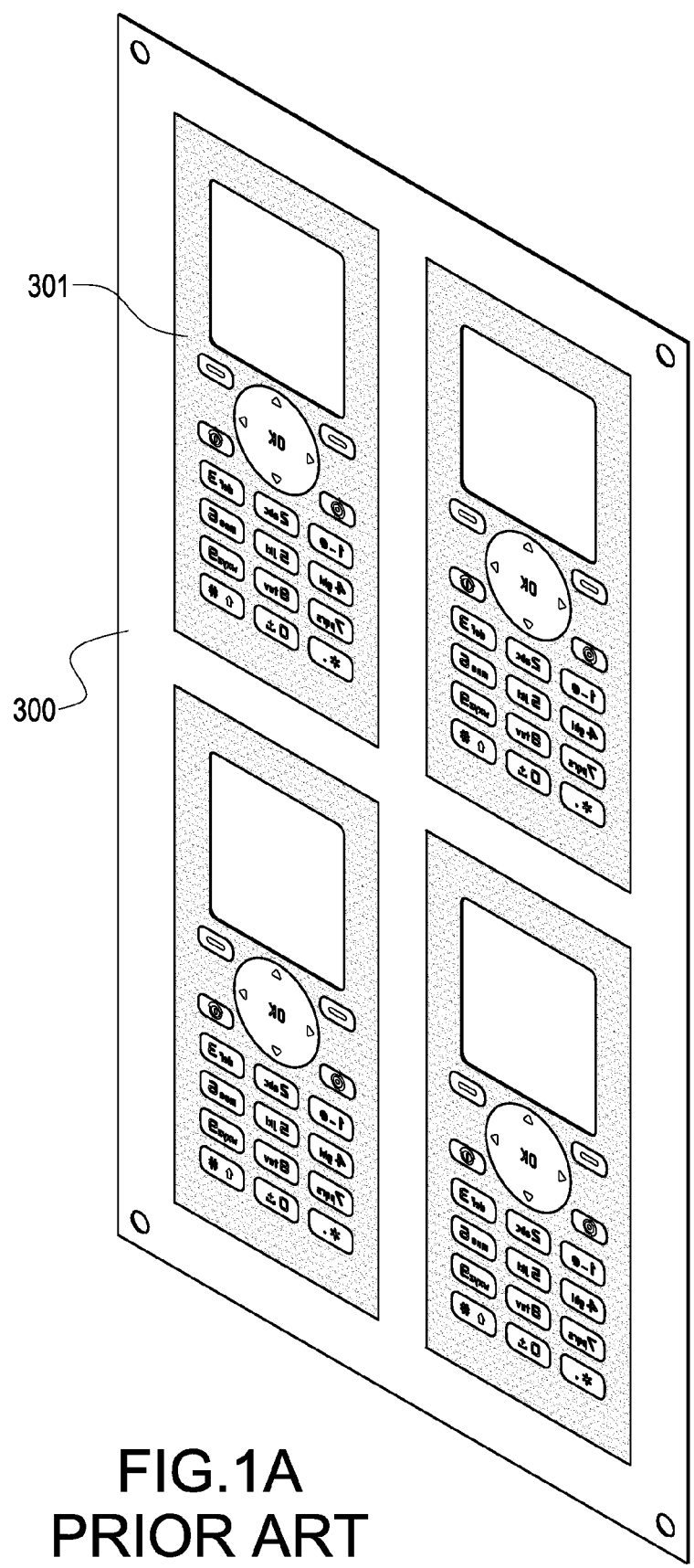
FIG. 1A~1C are manufacturing illustrations for a panel of a traditional mobile phone.
Figure 1B:
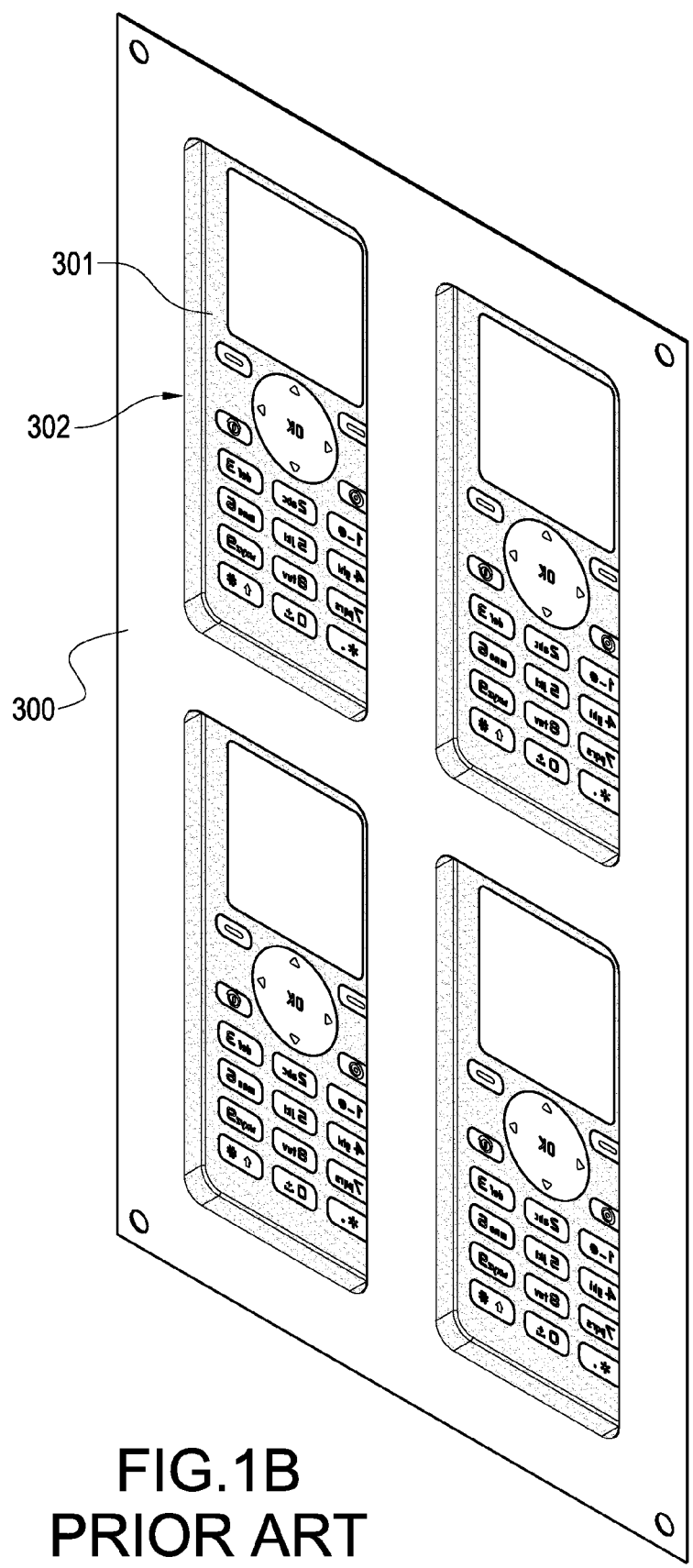
Figure 1C:
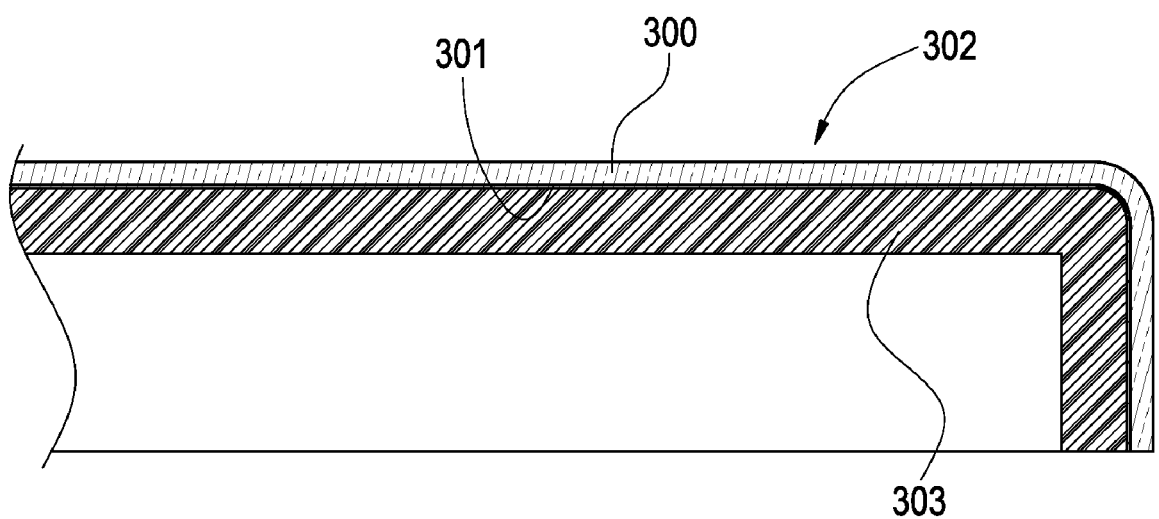
Figure 2:
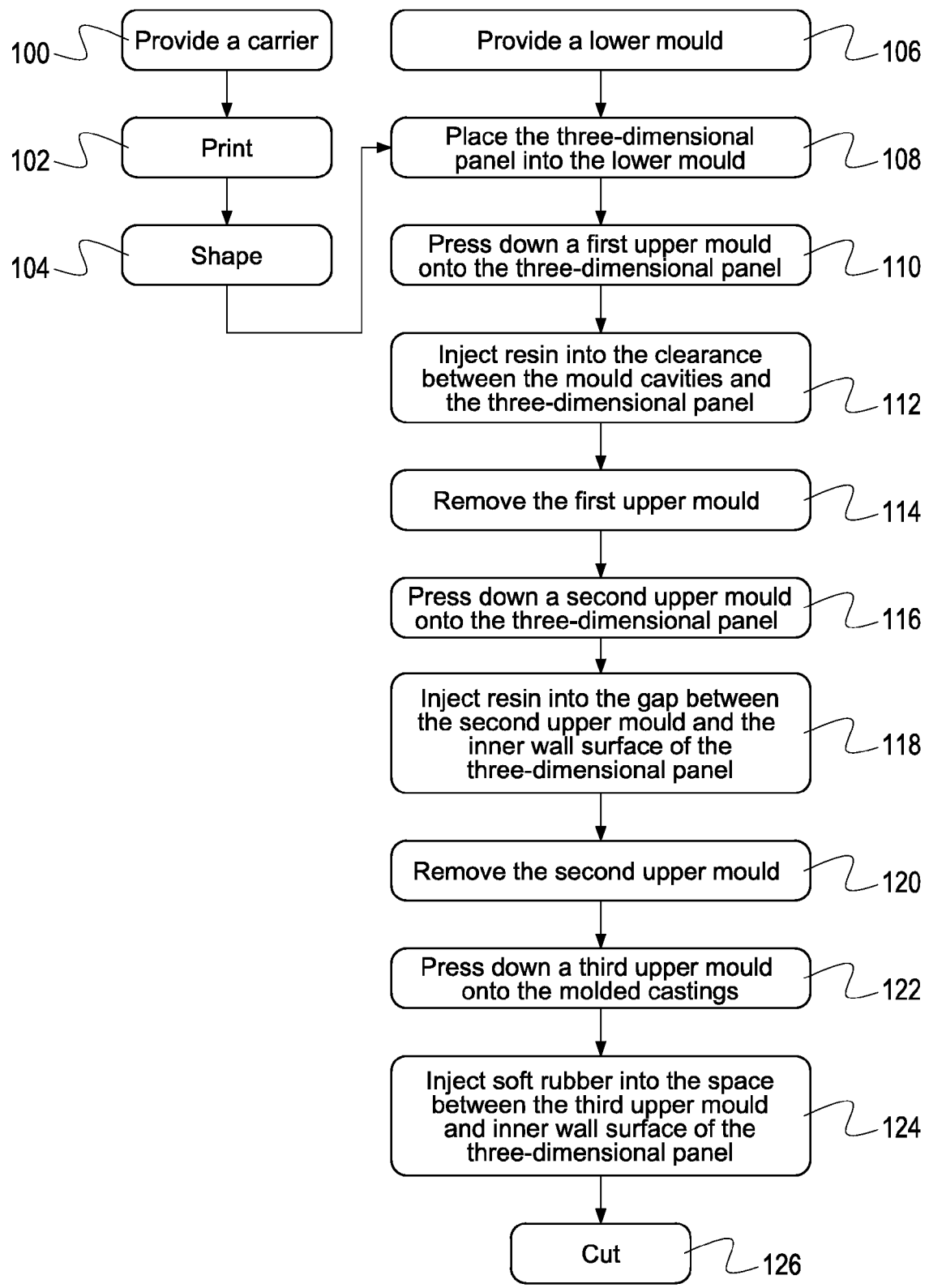
FIG. 2 is a flowchart illustrating a manufacturing process of a panel of an electronic device according to the present invention.
Figure 3:
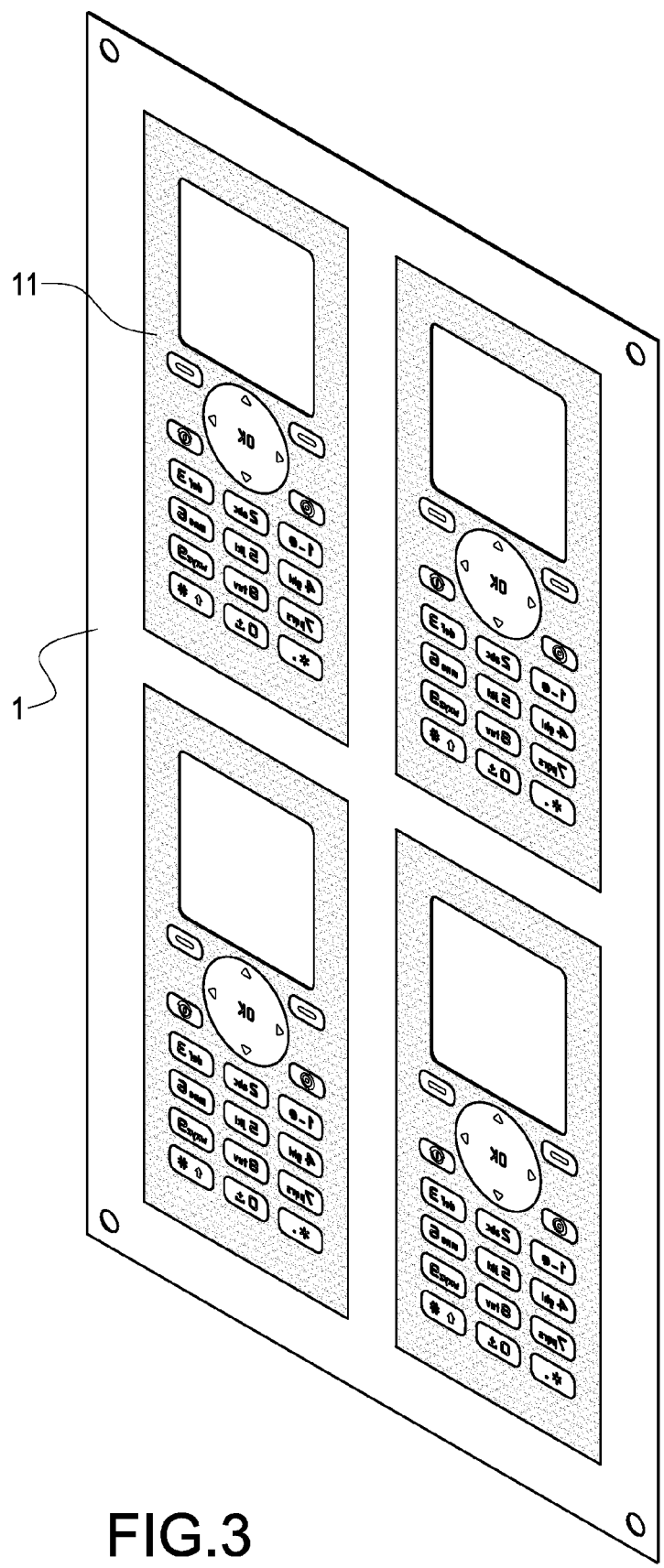
FIG. 3 is an appearance illustration of a piece body according to the present invention.

Please refer to FIG. 2 and FIG. 3, which are panel manufacturing flowchart and piece body appearance illustration of an electronic device according to the present invention. In these figures, as shown in step 100, when a panel according to the present invention is manufactured, a piece body 1 made of a material of transparent PC (polycarbonate) film is, first of all, provided.

In step 102, regarding printing process, a plurality of plane panel patterns 11 is printed on the back surface of the piece body 1 by means of ink.

Figure 4:
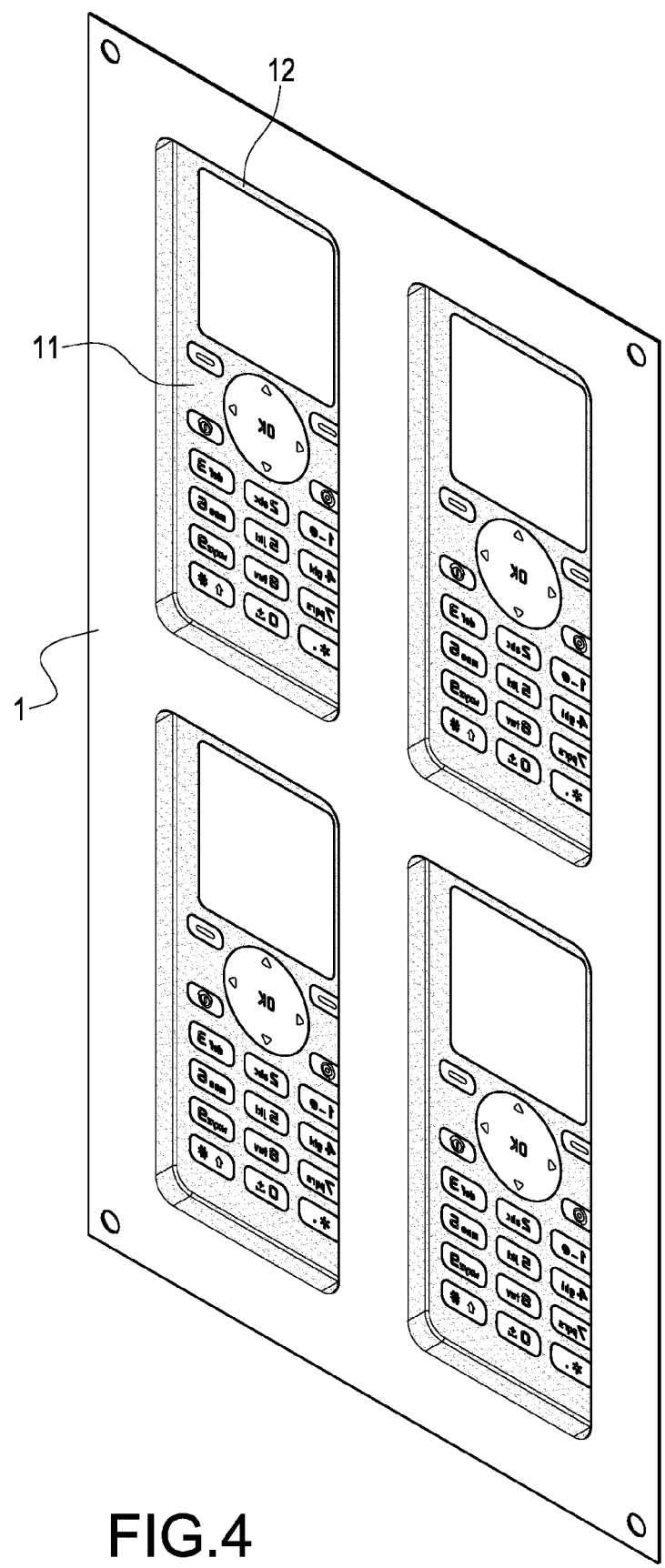
FIG. 4 is an appearance illustration of a piece body according to the present invention that has been thermally press-molded.

In step 104, as shown in FIG. 4, the aforementioned printed panel patterns 11 are thermally pressed into three-dimensional panels projecting out of the surface of the piece body 1 under a plastically shaping process, and the printed panel patterns are located at the inside of the three-dimensional panels 12.

Figure 5:
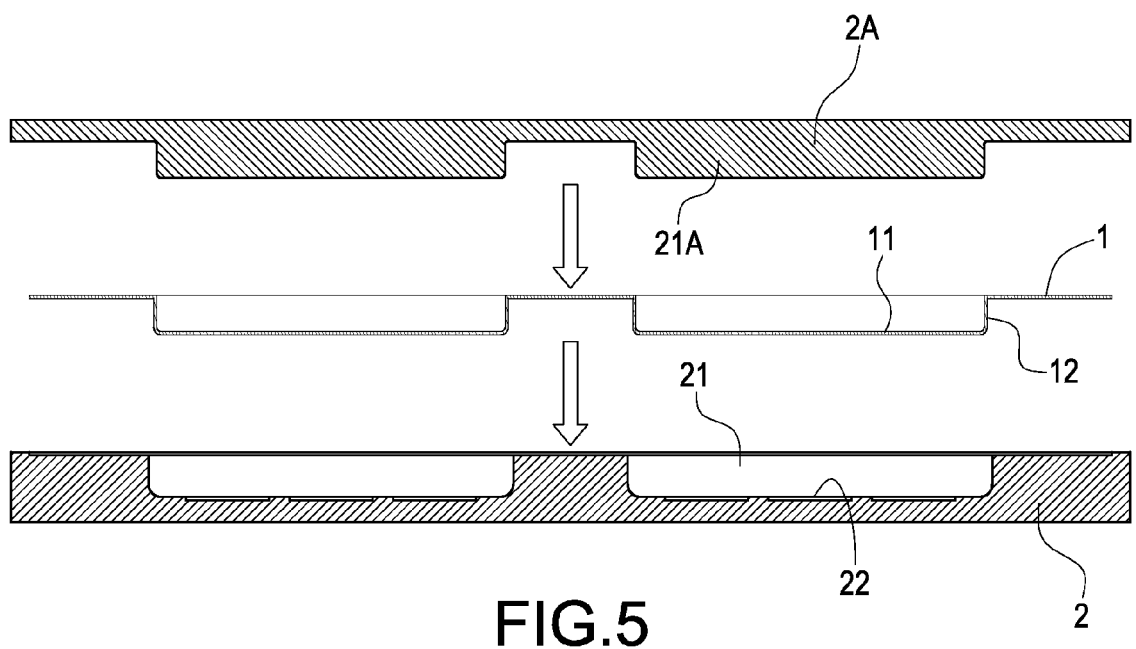
FIG. 5 is an illustration of a thermally press-molded piece body in connection with the moulds according to the present invention.

In step 106, as shown in FIG. 5, a lower mould 2 is provided, on which a plurality of mould cavities 21 having same forms as those of the three-dimensional panels 12 are arranged, and keycaps 311 contours may be depressed upon the bottom surfaces of the mould cavities 21, or any kind of three-dimensional patterns on the surfaces of the keys, for example, character, numeral, Braille, and texture line, etc., may be formed on the pattern core surfaces 22.

In step 108, as shown in FIG. 5, the plural three-dimensional panels 12 are placed onto the mould cavities 21 of the lower mould 2, and there is appropriate clearance kept between the surfaces of the three-dimensional panels 12 and the mould cavities 21. When the three-dimensional panels 12 are placed onto the plastic injection mould 2, since of the change of the process, the formed three-dimensional panels 12 may be aligned to the mould 2 by means of externally locating holes, so that the position deviation is effectively avoided after injection and the product yield is thereby promoted significantly.

In step 110, cores 21A of a first upper mould 2A are pressed onto the inside surfaces of the three-dimensional panels 12.

Figure 6A:
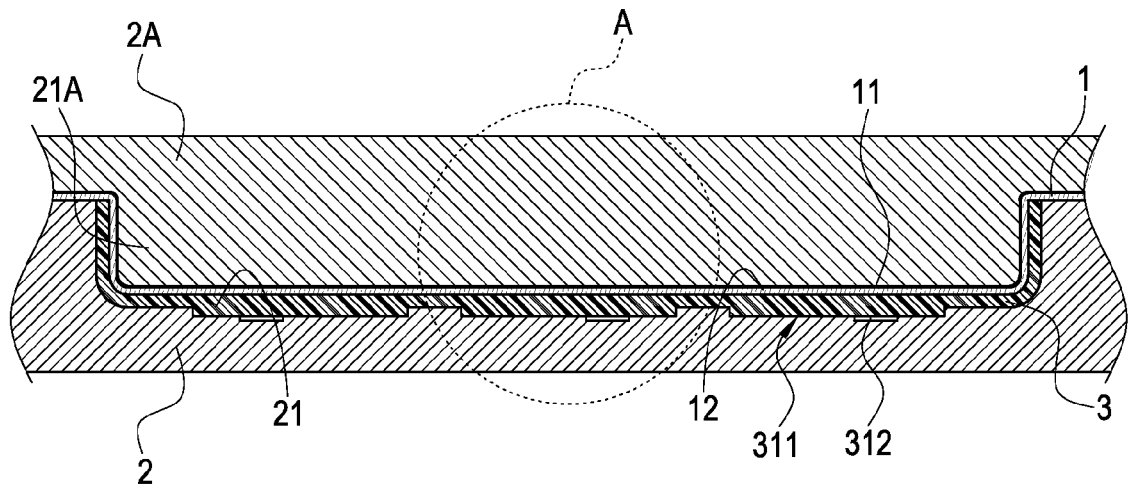
FIG. 6A is an illustration showing a first upper mould pressed together with a lower mould according to the present invention.
Figure 6B:
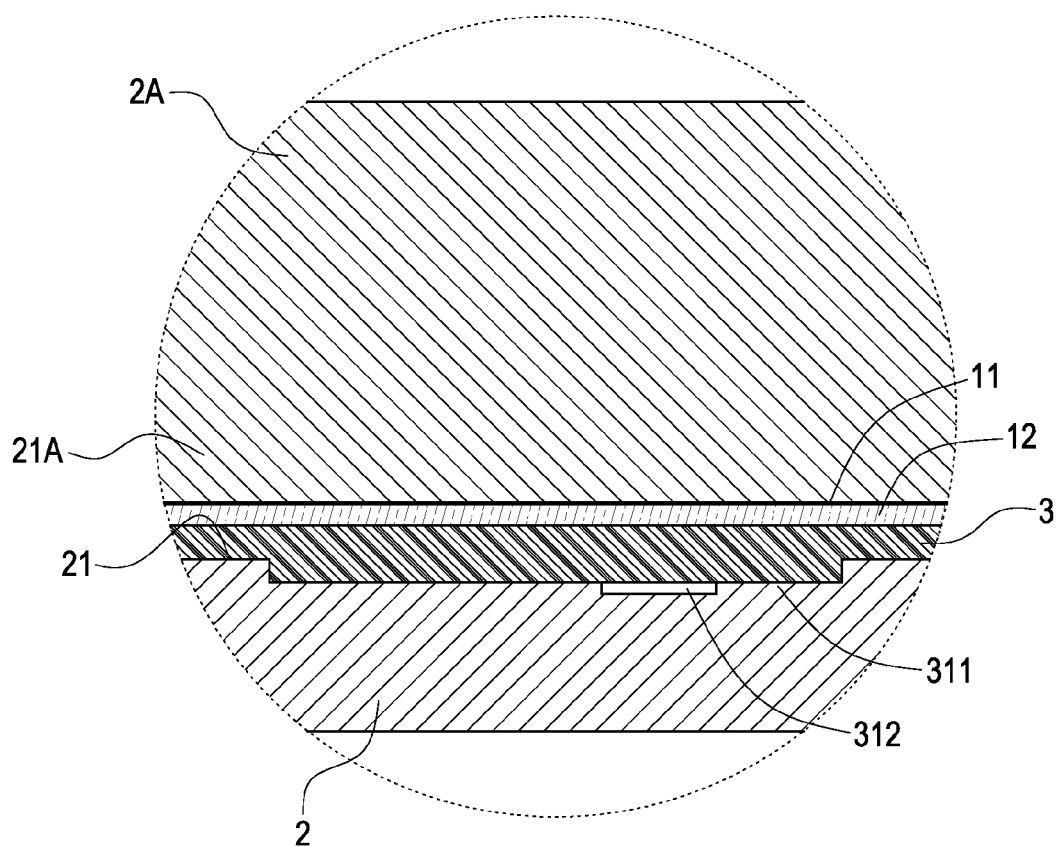
FIG. 6B is a locally enlarging illustration of the embodiment in FIG. 6A.

In step 112, as shown in FIG. 6A and FIG. 6B, a material of hard resin mixed with material having excellent properties of wearing-resistance and scraping-endurance is injected into the clearance between mould cavities 21 and the surface of the three-dimensional panels 12 to form a transparent cladding layer 3 for wear-resisting and protecting the three-dimensional panels 12. Furthermore, on the surface of the cladding layer 3, it is possible to form keycaps 311 contours or texture lines, or any kind of three-dimensional patters 312 on a keycap 311 surface, for example, character, numeral, and Braille, etc., making this surface generate special effectiveness.

In step 114, after the cladding layer 3 being formed on the three-dimensional panels 12, the first upper mould 2A is removed from the three-dimensional panels 12, making this semi-product rested on the lower mould 2.

Figure 7A:
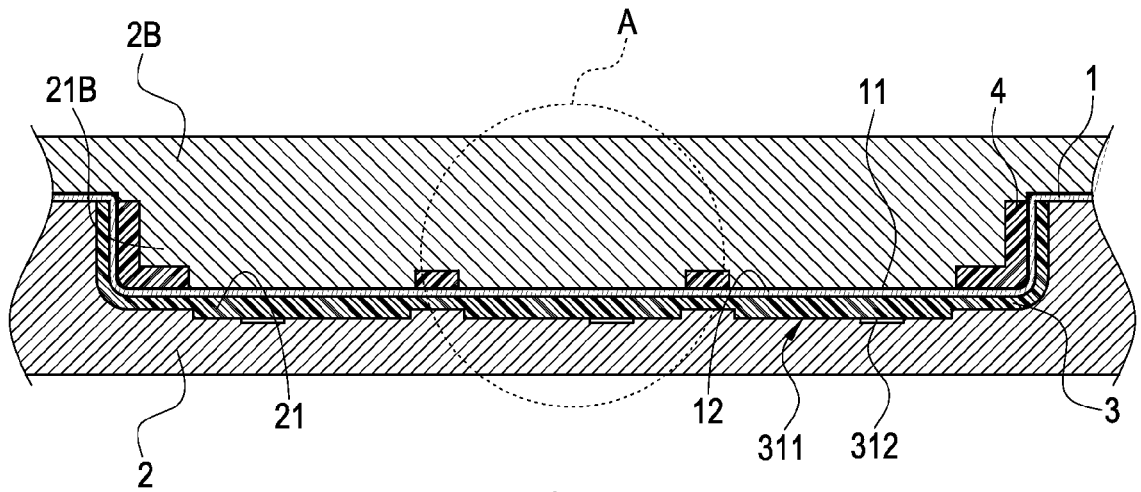
FIG. 7A is an illustration showing a second upper mould pressed together with a lower mould according to the present invention.
Figure 7B:
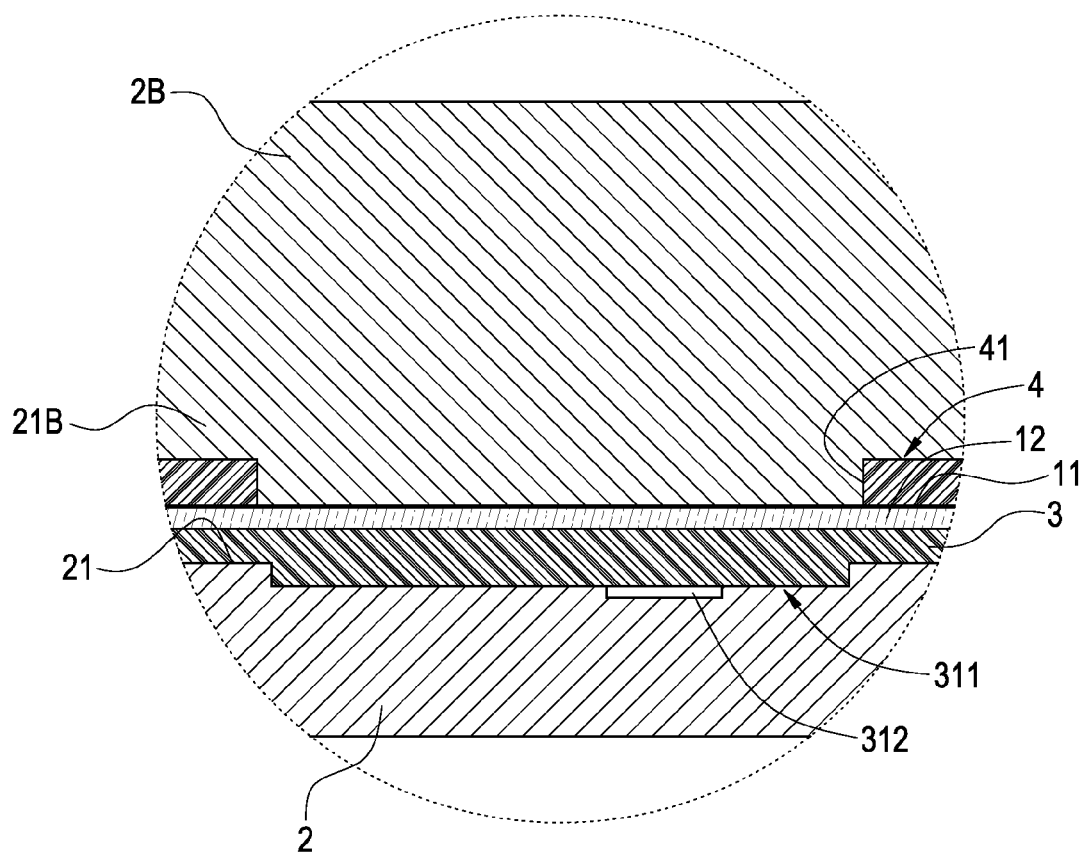
FIG. 7B is a locally enlarging illustration of the embodiment in FIG. 7A.

In step 116, as shown in FIG. 7A and FIG. 7B, after the first upper mould 2A being removed, while this semi-product is still rested on the lower mould 2, cores 21B of a second upper mould 2B are then pressed onto the inner wall surfaces of the three-dimensional panels 12, forming a gap thereon, into which material of hard resin may be injected.

In step 118, as shown in FIG. 7A and FIG. 7B, a material of hard resin mixed with a material having excellent property of impact-resistance is injected into the gap formed between the cores 21B of the second upper mould 2B and the inner wall surfaces of the three-dimensional panels 12, so as to form a supporting layer 4 for supporting the three-dimensional layers 12.

In step 120, after the supporting layer 4 being formed, the second upper mould 2B is then removed immediately, making this semi-product rested on the lower mould 2.

Figure 8A:
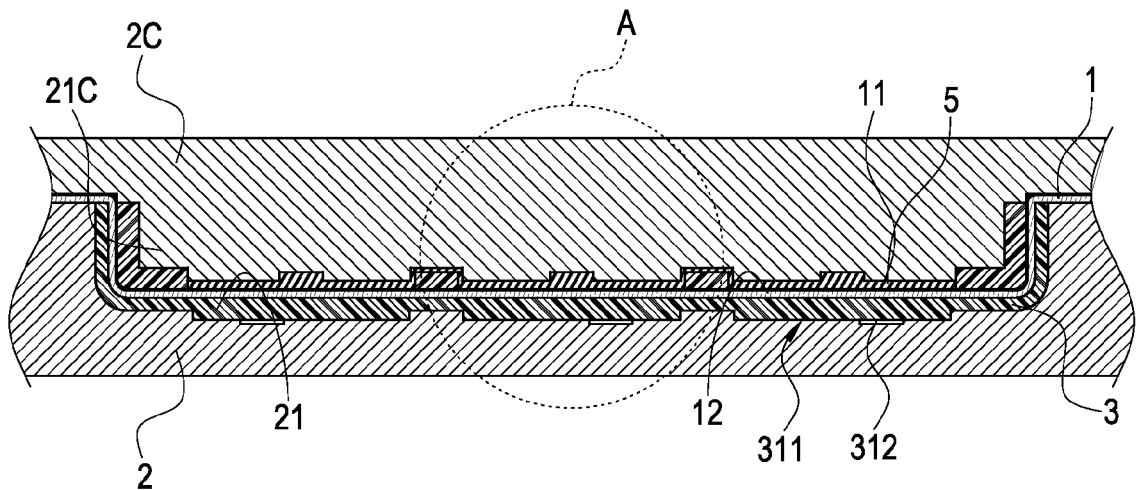
FIG. 8A is an illustration showing a third upper mould pressed together with a lower mould according to the present invention.
Figure 8B:
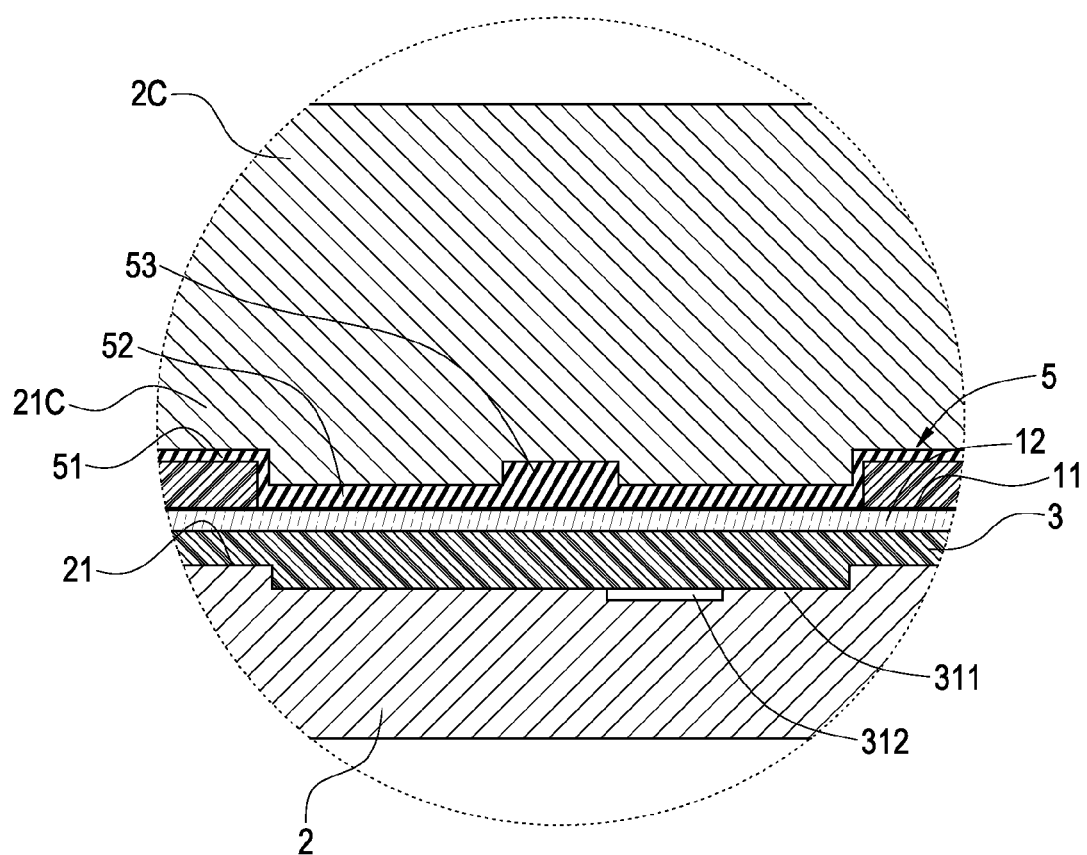
FIG. 8B is a locally enlarging illustration of the embodiment in FIG. 8A.

In step 122, as shown in FIG. 8A and FIG. 8B, after the second upper mould 2B being removed, cores 21C of a third upper mould 2C is pressed onto the inner wall surfaces of the three-dimensional panels 12 and the supporting layer 4, whereby a space, into which a material of rubber may be injected, is formed between the cores 21C and the inner wall surfaces.

In step 124, as shown in FIG. 8A and FIG. 8B, the material of rubber is injected into the space formed between the cores 21C of the third upper mould 2C and the inner wall surfaces of the three-dimensional panels 12, thus an elastic layer 6 of keying function being thereby formed.

In step 126, after the panel structure manufacture being completed, the product is removed from the mould, and the panel is separated to form an integrated structure with a single panel housing and keypad.

Figure 9:
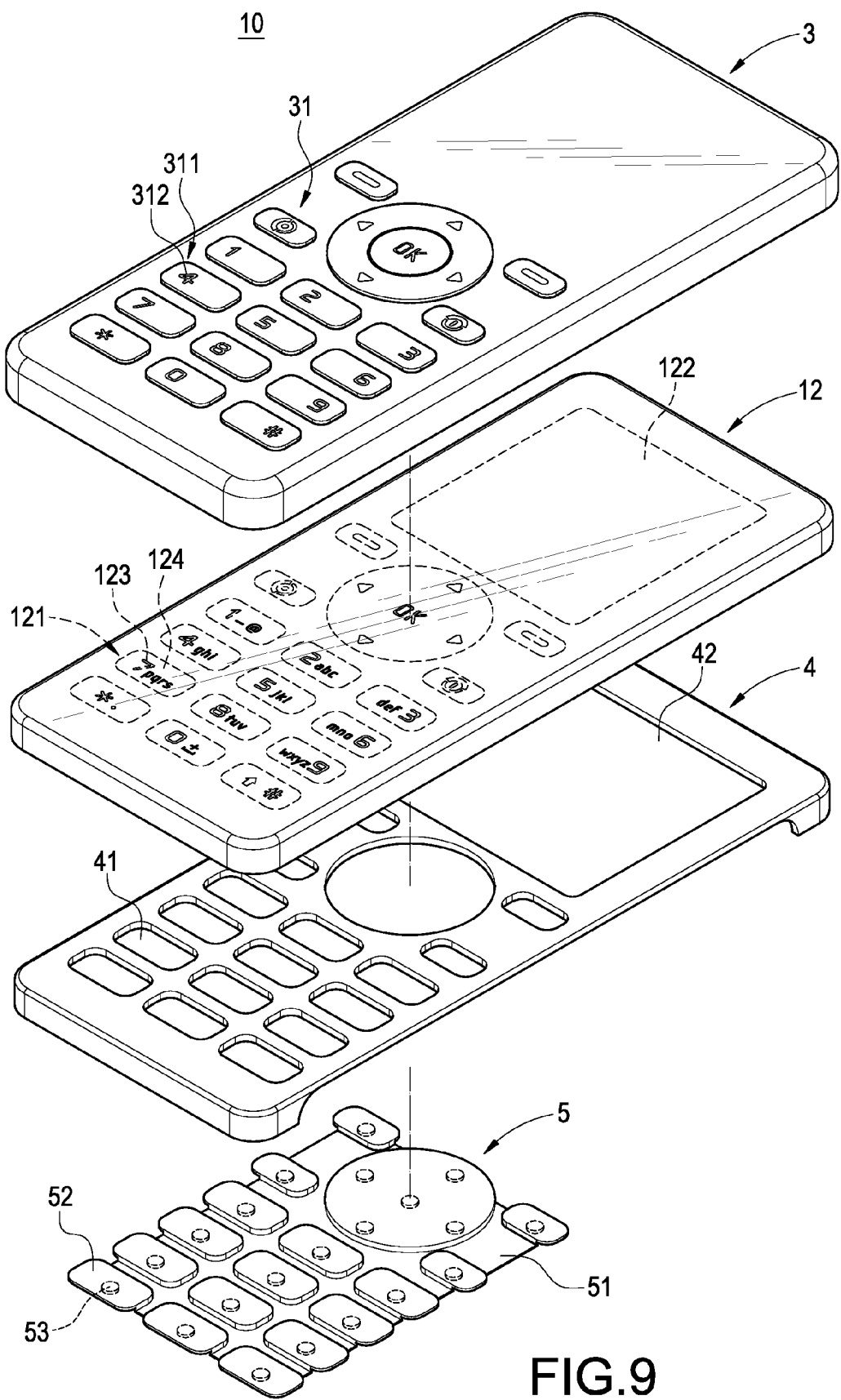
FIG. 9 is an explosive illustration of the structure of a panel according to the present invention.

Please refer to FIG. 9, which is an explosive illustration showing the structure of a panel according to the present invention. As shown in FIG. 9, the panel structure 10 according to the present invention consists of a three-dimensional panel 12, a cladding layer 3, a supporting layer 4, and an elastic layer 5.

The three-dimensional panel 12 is a rectangular body, on which keypad patterns 121 and a display window 122 are disposed, wherein the keypad pattern 121 consists of a plurality of key patterns 123, each of which has different plane patters 124 of various kinds, such as: character, numeral, and symbol, etc.

The cladding layer 3, which is made of transparent material having excellent properties of wearing-resistance and scraping-endurance, is clad on the surface of the three-dimensional panel 12, and on which a three-dimensional keypad 31 is arranged corresponding to the keypad pattern 121 and consists of a plurality of keycaps 311, on the surface of each of which or of the cladding layer 3, any kind of three-dimensional pattern 312 may be formed, such as: character, numeral, Braille (used by the blind), and the texture line, etc.

The supporting layer 4, which is made of material of transparent hard resin of excellent impact-endurance, is clad on the inner wall surface of the three-dimensional panel 12, and on which a plurality of thorough holes 41 corresponding to the keypad patterns 121 and an opening 42 corresponding to the display window 122 are arranged.

The elastic layer 5, which is made of a material of soft rubber, is arranged a bearing layer 51 thereon, which have a plurality of assembled/connected elastic bodies 52 corresponding to the thorough holes 41, and a plunger 53 is arranged at the other side of each elastic body 52.

Figure 10A:
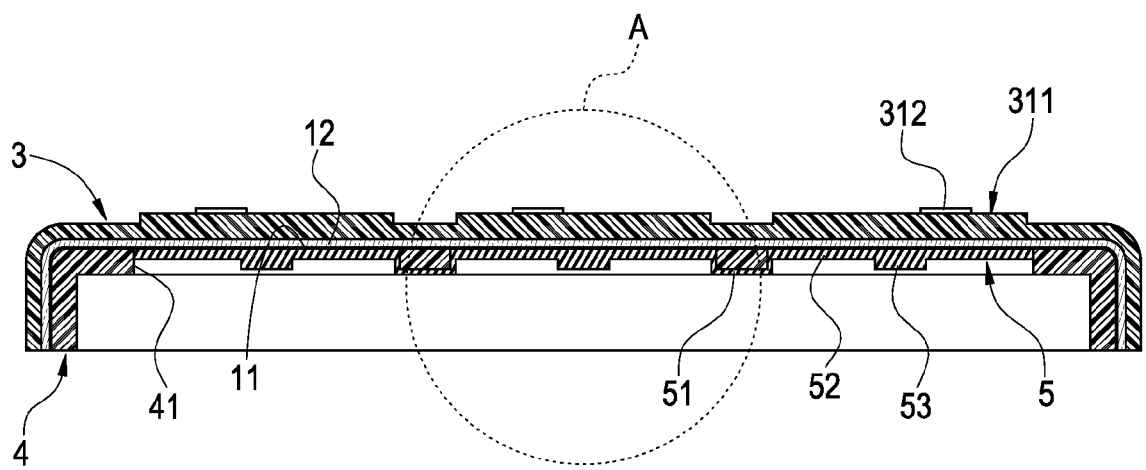
FIG. 10A is a cross-sectional illustration of a panel according to the present invention.
Figure 10B:
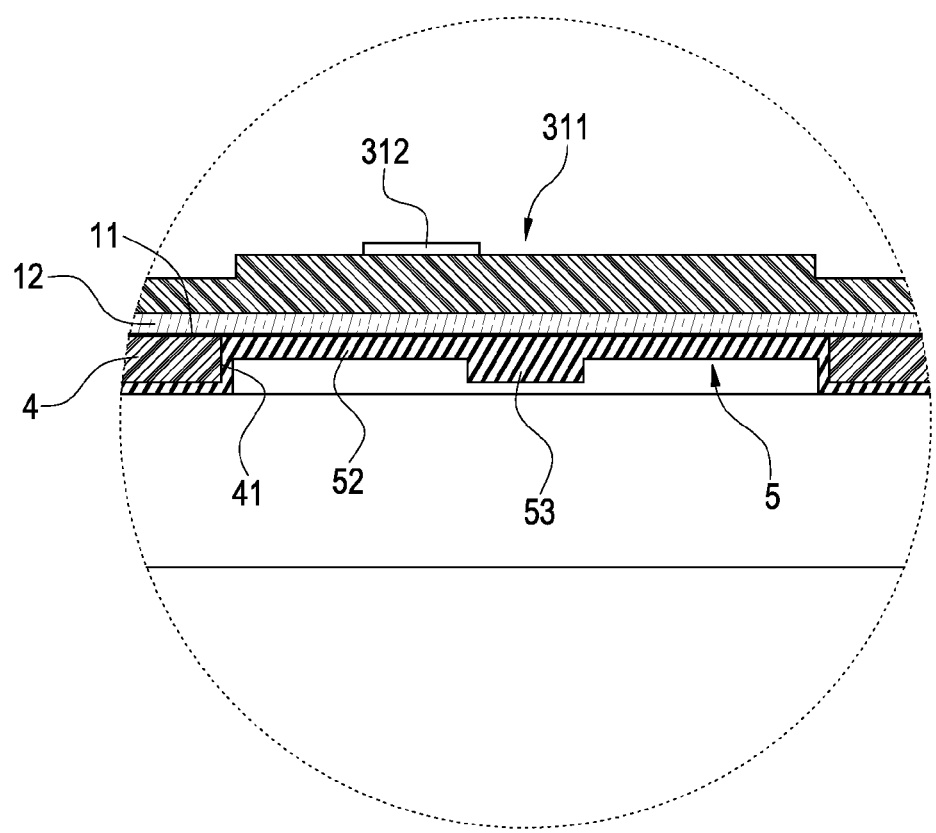
FIG. 10B is a locally enlarging illustration of the embodiment in FIG. 10A.

Please refer to FIG. 10A and FIG. 10B, which respectively are a cross-sectional view of a panel according to the present invention and a locally enlarging illustration thereof. As shown in these figures, the three-dimensional panel 12 is sandwiched between the cladding layer 3 and the supporting layer 4, making entire panel have specific stiffness, in the meantime, since of the characteristic of wearing-resistance, the cladding layer 3 on the three-dimensional panel 12 being able to protect the surface of the three-dimensional panel 12 from being damaged by external objects.

In addition, the three-dimensional pattern 312 on the surface of the keycap 311 is provided for being touched by a user during a pressing down action by which, not only the position of a key is known, but also the function of a key is obtained and, if the three-dimensional pattern 312 is a Braille pattern for the blind, it may further make the blind perceive the position and the function of any key.

Figure 11:
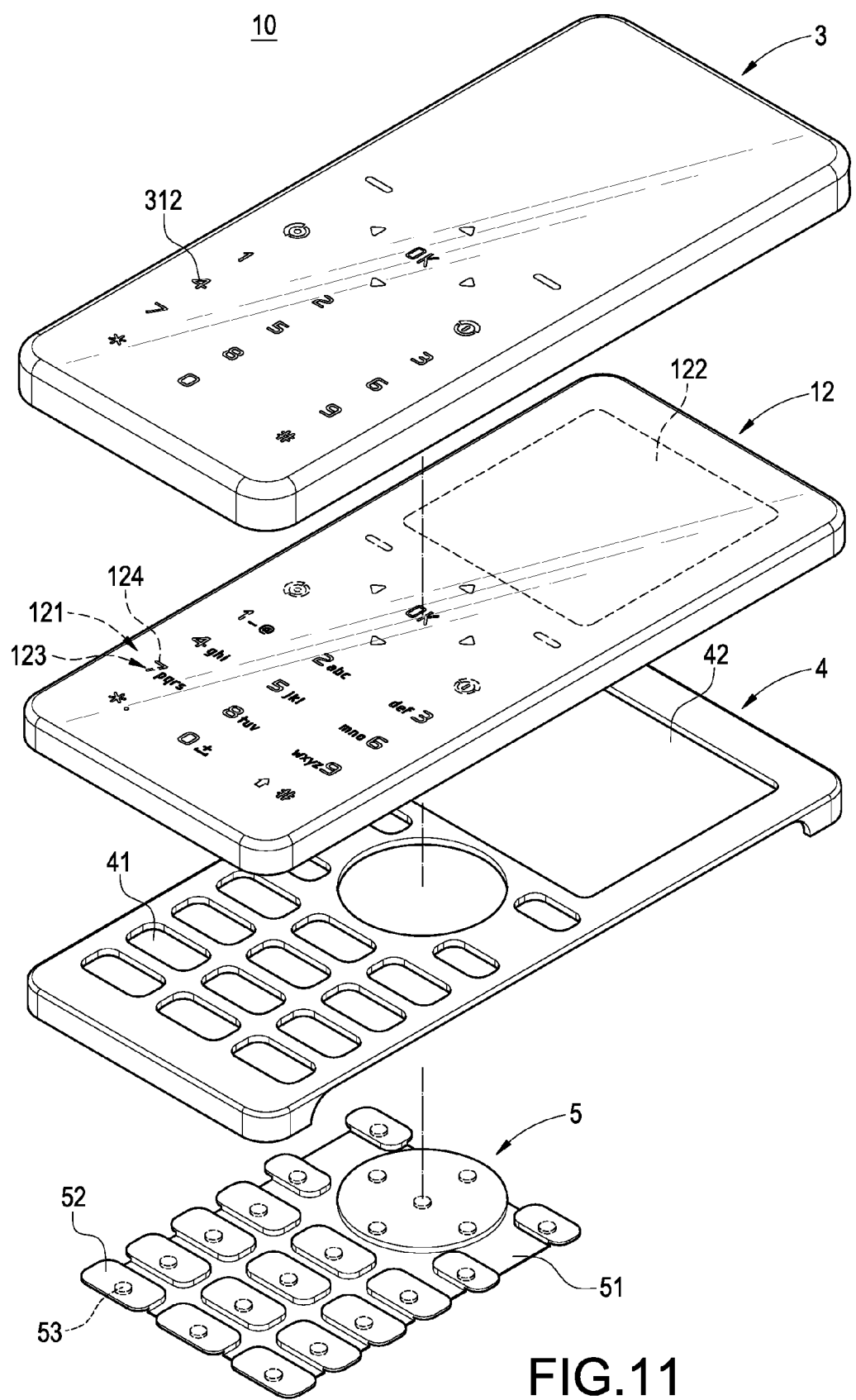
FIG. 11 is an explosive illustration of the structure of another panel according to the present invention.

Please refer to FIG. 11, which is an explosive illustration of the panel structure of another embodiment according to the present invention. As shown in this figure, the disclosed panel structure 10 is roughly same as that of FIG. 9, the differences being: there is no key contour printed for the keypad patterns 121 on the three-dimensional panel 12 but, only plane patterns 124, for example, character, numeral, and symbol, etc., are printed corresponding to the keys; and, only three-dimensional patters 312 corresponding to the plane patterns 124 of the three-dimensional panel 12 are formed on the surface of the cladding layer 3 corresponding to the positions of the plane patterns 124. Therefore, when a user touches the three-dimensional patterns 312 on the surface of the cladding layer 3, he can easily identify the function and the position of the keycap 311.

Figure 12:
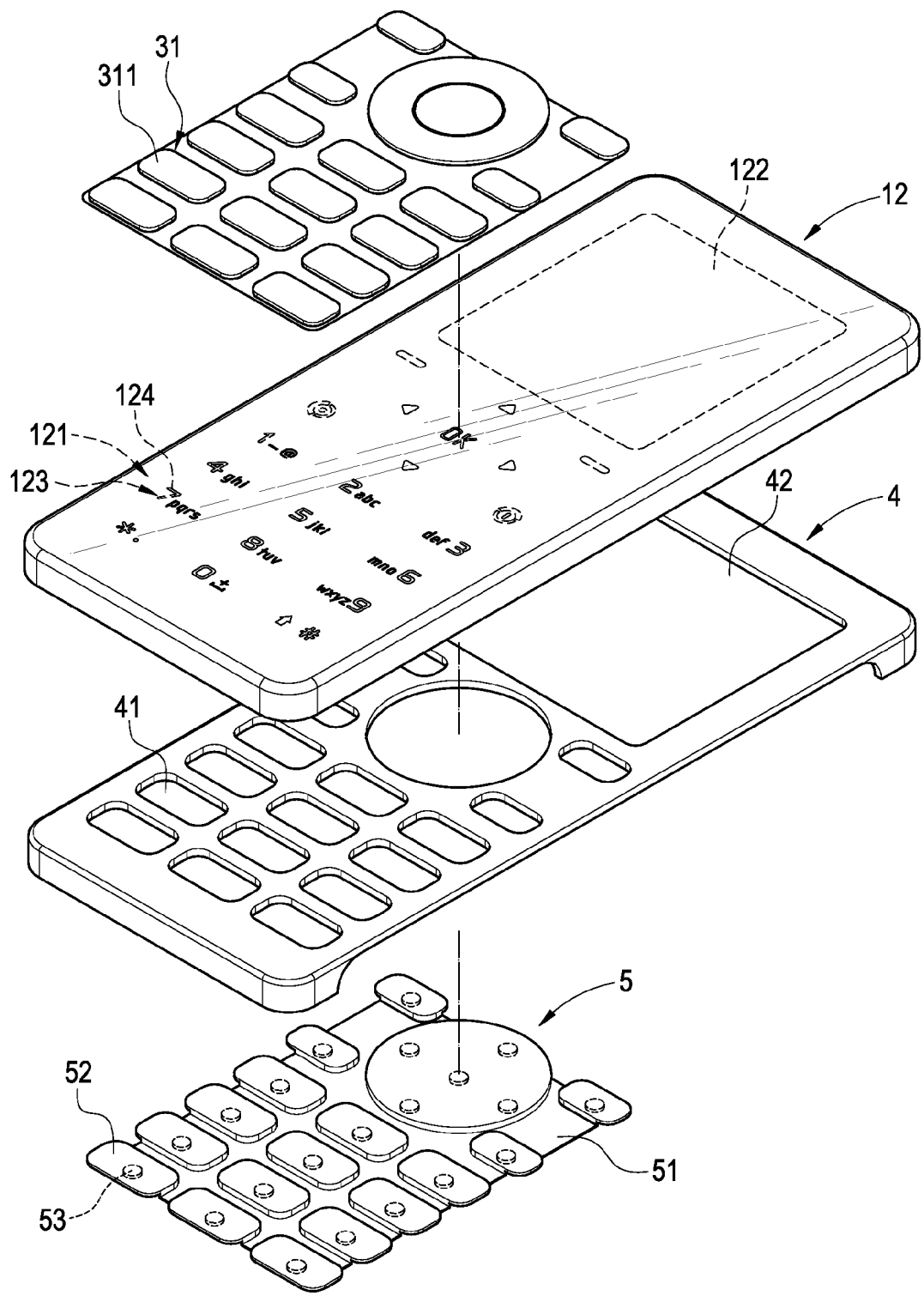
FIG. 12 is an explosive illustration of the structure of a further panel according to the present invention.

Please refer to FIG. 12, which is an explosive illustration of the panel structure of a further embodiment according to the present invention. As shown in this figure, the disclosed panel structure is roughly same as that of FIG. 11, the only difference being: when the cladding layer 3 is formed on the surface of the three-dimensional panel 12, the contours of keypads 31 may be directly formed or clad on the key patterns 124 of the three-dimensional panel 12, while each keycap 311 is in corresponding to one set of plane patterns 124. Thereby, when a user touches the contour of a keycap 311, he can easily identify the position and the function of the keycap 311.

Figure 13:
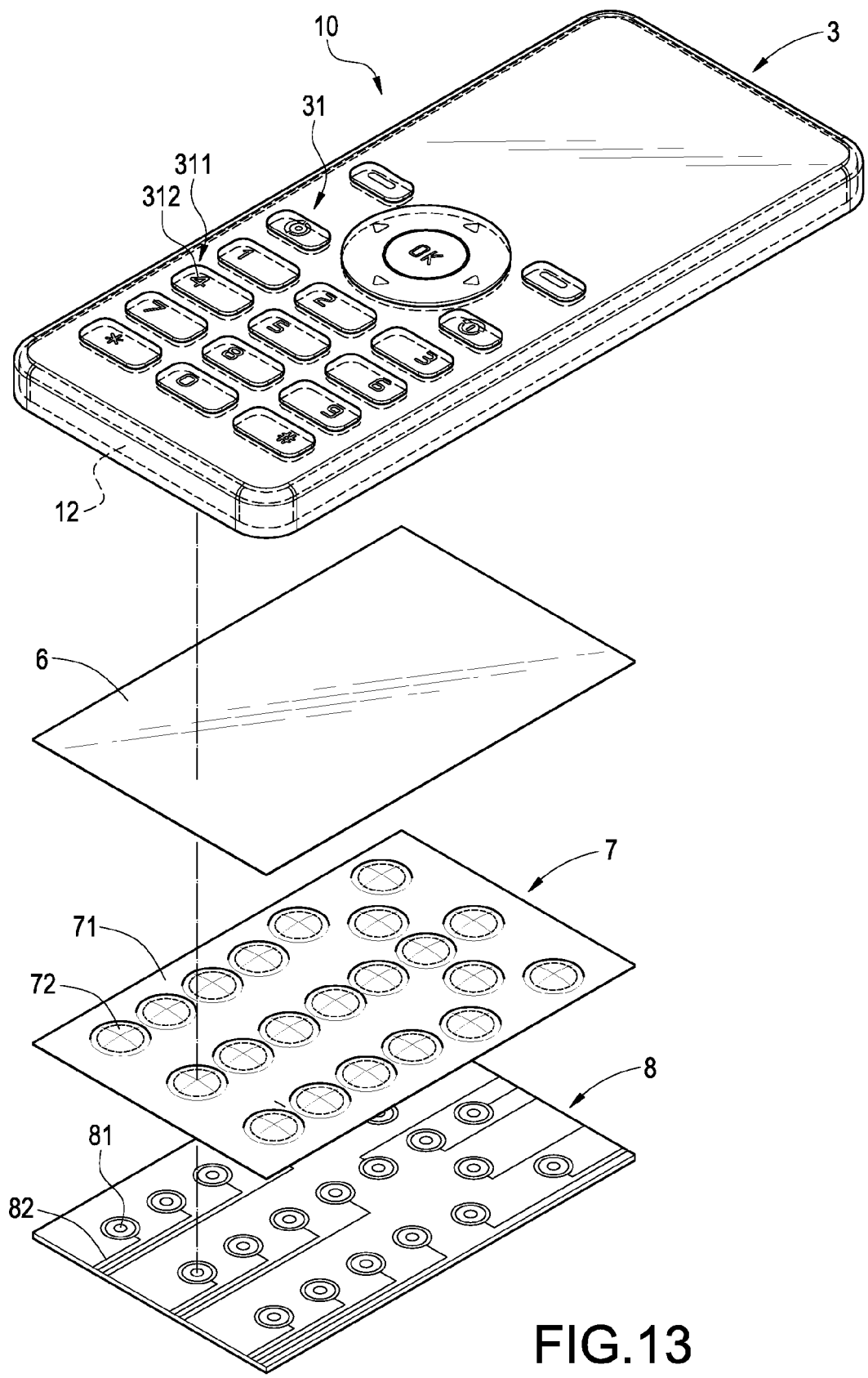
FIG. 13 is an explosive illustration showing a panel structure according to the present invention in connection with a lighting layer, a flexible printed circuit board, and an elastic layer.

Please refer to FIG. 13, which is an explosive illustration showing the panel structure according to the present invention combined with a lighting layer, a flexible printed circuit board, and an elastic layer. As shown in this figure, under the keys of the panel structure 10, a lighting layer 6, an elastic piece layer 7, and a flexible printed circuit board 8 are sequentially disposed.

In this preferable embodiment, the lighting layer 6, positioned under the supporting layer 4 and the elastic layer 5 of the panel structure 10, is one kind of electroluminescence (EL) or light guide film.

The elastic piece layer 7, disposed under the lighting layer 6, has a thin piece body 71, on the other side of which a plurality of metallic domes 72 are arranged corresponding to the plungers 53 of the elastic layer 5.

The flexible printed circuit board 8, which is a printed circuit board of film type, is printed with circuits 81 and contact points 82, which are arranged corresponding to the metallic domes 72.

Figure 14:
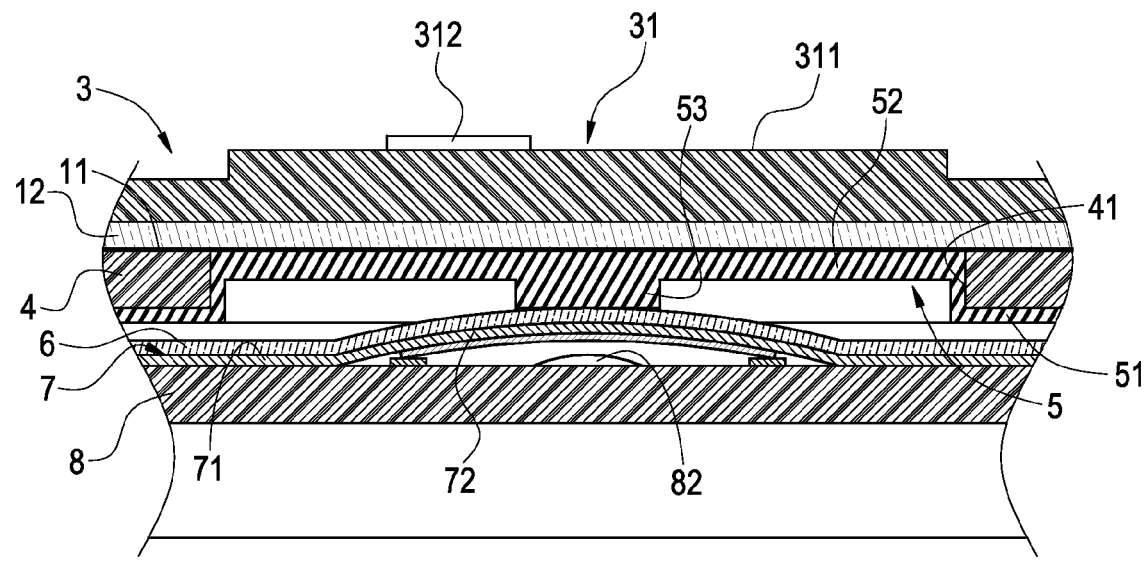
FIG. 14 is a cross-sectional illustration of the embodiment in FIG. 13.
Figure 15:
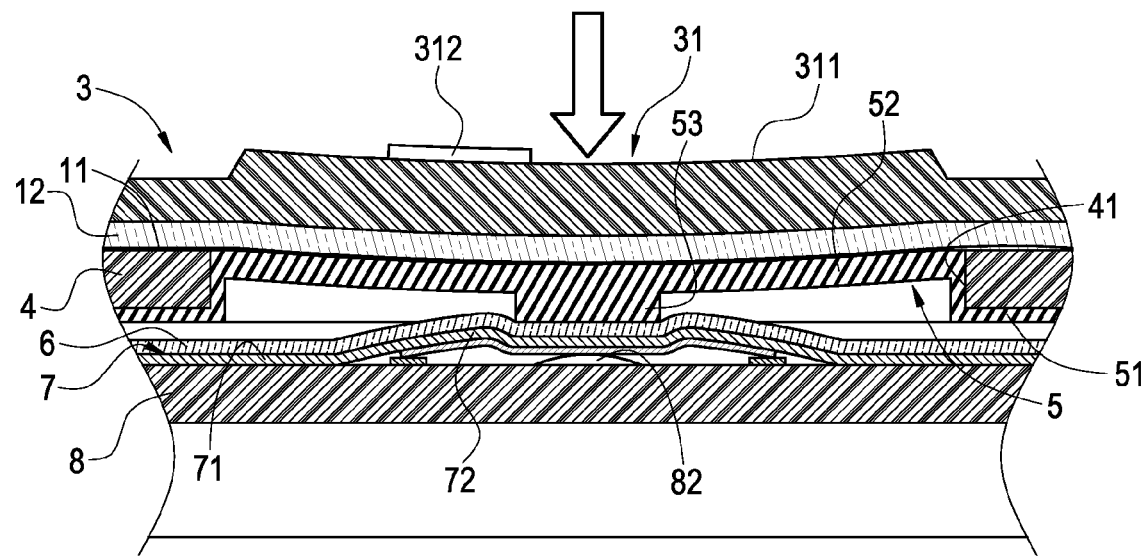
FIG. 15 is an illustration showing the pressing down motion of the embodiment in FIG. 14.

Please refer to FIG. 14 and FIG. 15, which respectively are a cross-sectional view of the embodiment in FIG. 13 and an illustration showing the pressing action thereof. As shown in these figures, when the electronic device is under use, a plane light source, which is generated from the lighting layer 6, directly illuminates the bottom of the elastic layer 5, and the light of which passes through the elastic layer 5 and the elastic panel 12, making the surfaces of keycaps 311 on the panel structure display an illuminant effectiveness.

When a user applies an external force on the surface of the keycap 311, the keycaps 311, the three-dimensional panels 12, and the elastic layer 5 are deformed accordingly, whereby the plunger 53 of the elastic layer 5 presses onto the lighting layer 6, making the lighting layer 6, the piece body 71, and metallic dome 72 deformed and pressed onto the flexible printed circuit board 8 and the contact point 82 to generate an operational output signal.

Figure 16:
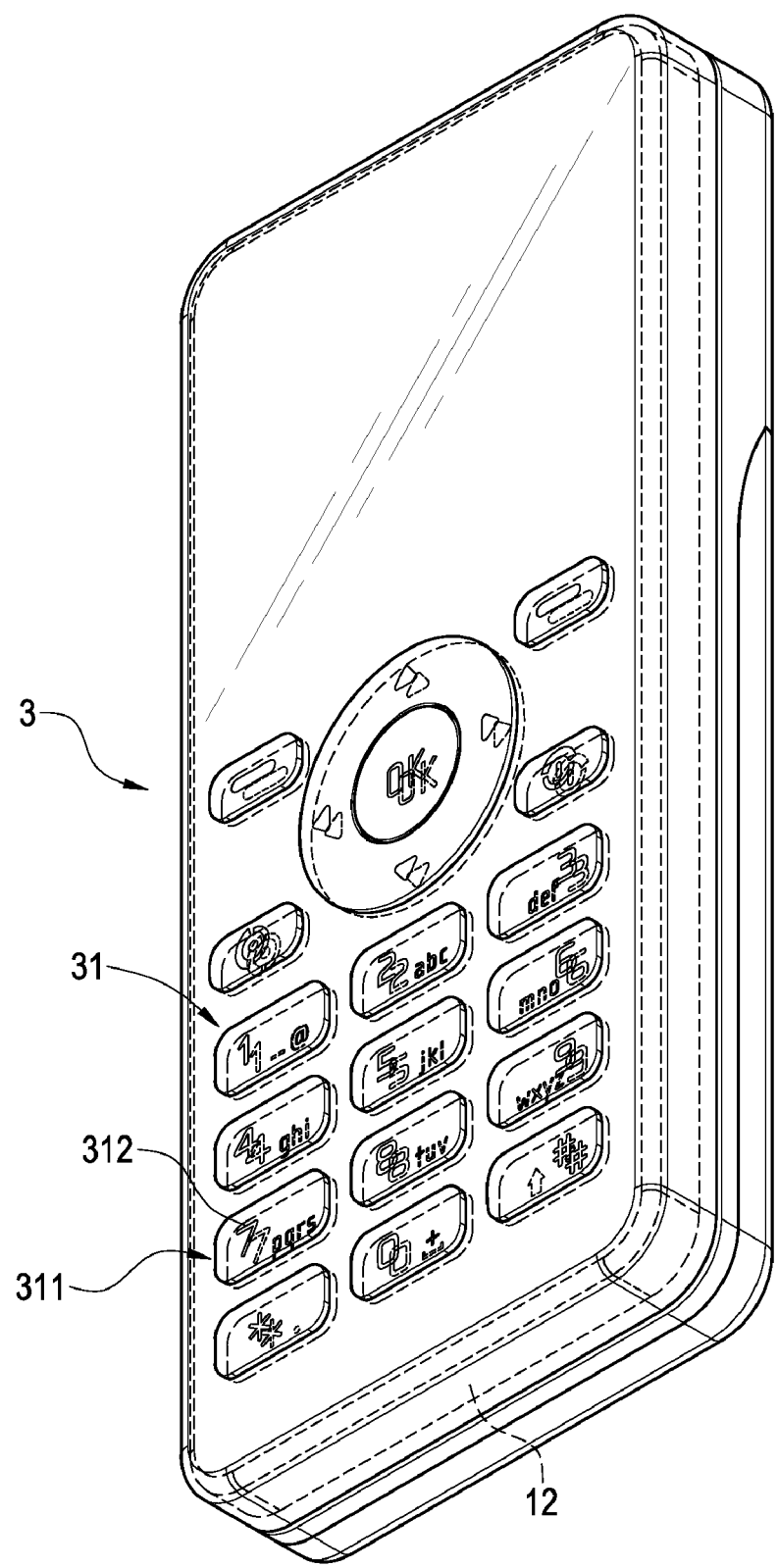
FIG. 16 is an illustration showing a panel structure according to the present invention used in a mobile phone.
Figure 17:
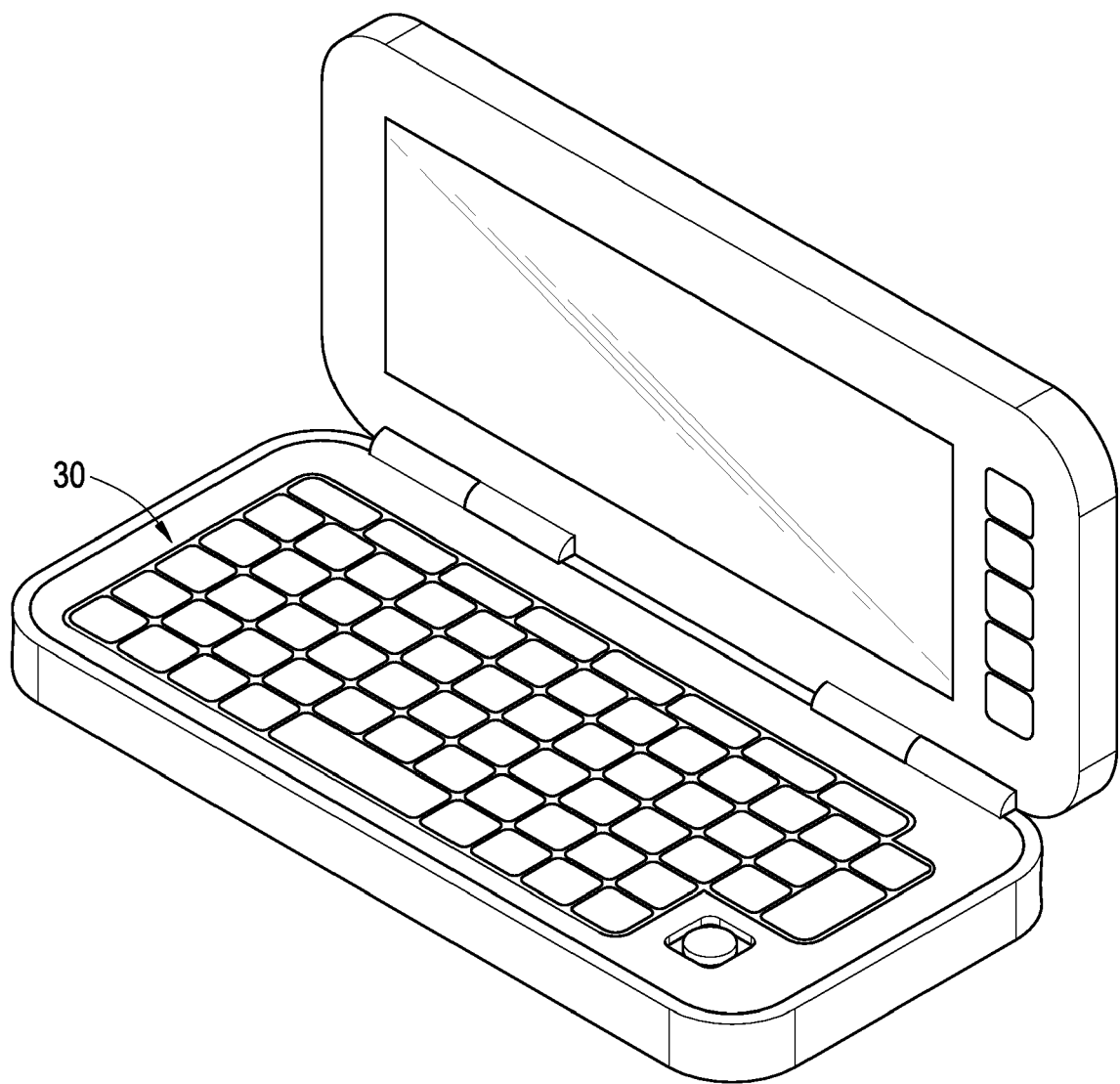
FIG. 17 is an illustration showing a panel structure according to the present invention used in a personal digital assistant (PDA)

Please refer to FIG. 16 and FIG. 17, which are illustrations showing the panel structure according to the present invention applied in two portable/mobile electronic devices. As shown in these figures, the panel structure 10 according to the present invention is disposed on a portable/mobile electronic device that may be a mobile phone 20 or a PDA (personal digital assistant) 30. Except of smoothness, the surface of the panel structure 10 also has the function to prevent objects and water from invading into the potable/mobile electronic devices.

Figure 18:
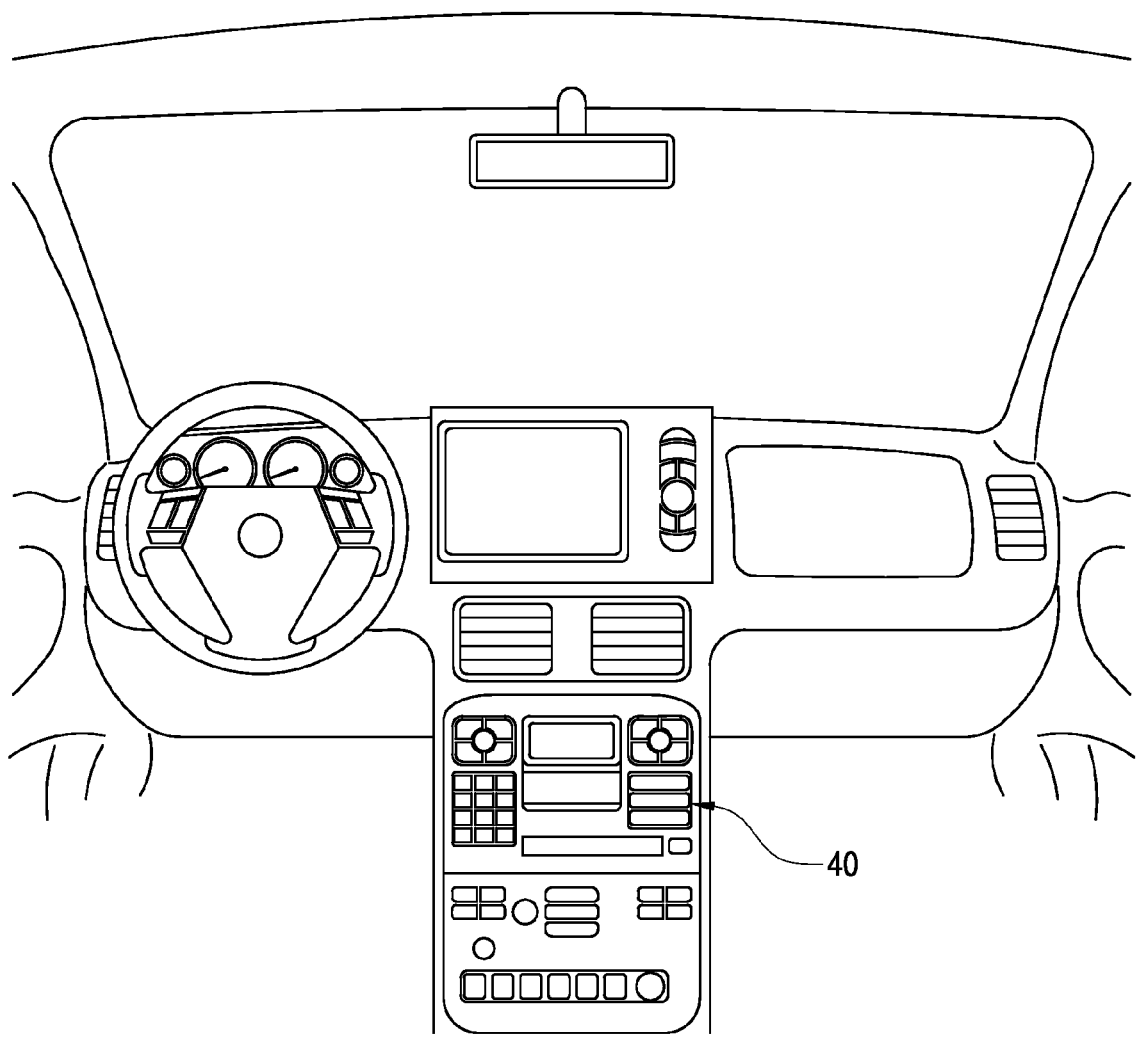
FIG. 18 is an illustration showing a panel structure according to the present invention used in automobile stereo panel.

Please refer to FIG. 18, which is an illustration showing the panel structure according to the present invention applied as a stereo panel in an automobile. As shown in this figure, a panel structure 10 according to the present invention not only can be applied in a portable/mobile device, but also can be arranged as a stereo panel in an automobile, whereby air conditioning system, video/audio systems, and GPS (global positioning system) may be controlled.

Aforementioned structures are only preferable embodiments of the present invention, being not used to limit its executing scope. Any equivalent variation and modification made according to appended claims is all covered by the claims claimed by the present invention.

What is claimed is:

1. A method for manufacturing an electronic device panel, comprising following steps:

a) providing a piece body;
b) printing a plurality of panel patterns on the surface of the piece body;
c) shaping the panel patterns into a three-dimensional panel, and the panel patterns being located at the inside of the three-dimensional panel;
d) placing the three-dimensional panel arranged on the surface of the piece body between a lower mould and a first upper mould, injecting a material of hard resin into the clearance between the lower mould and the three-dimensional panel, and forming a cladding layer on the surface of the three-dimensional panel;
e) removing the first upper mould, placing a second upper mould onto the three-dimensional panel, injecting a material of hard resin into the gap between the second upper mould and the three-dimensional panel, and forming a supporting layer on the inner wall surface of the three-dimensional panel; and,
f) again, removing the second upper mould, placing a third upper mould onto the three-dimensional panel, injecting a material of soft rubber into the space between the third mould and the three-dimensional panel, and forming an elastic layer corresponding to the three-dimensional patterns between the support layer and the inner wall of the three-dimensional panel.

2. The method according to claim 1, wherein the piece body in step a) is made of material of transparent polycarbonate film.

3. The method according to claim 1, wherein the panel patterns in step b) includes keypad patterns and a display window, the keypad patterns comprises a plurality of key patterns of different forms, and each key pattern has plane patterns of character, numeral, or symbol.

4. The method according to claim 1, wherein the lower mould in step d) has a plurality of mould cavities, the bottom surfaces of which are depressed into pattern cores of key contours and key surface patterns of character, numeral, Braille, or texture line.

5. The method according to claim 1, wherein a three-dimensional pattern, which is a three-dimensional keypad comprised of a plurality of keys, is arranged on the cladding layer in step d).

6. The method according to claim 5, wherein three-dimensional patters of character, numeral, Braille, or texture line are formed on either of the key surface or the surface of the cladding layer.

7. The method according to claim 5, wherein the cladding layer is made of material of transparent hard resin.

8. The method according to claim 1, wherein the supporting layer in step e) is made of a material of transparent hard resin, and has a plurality of thorough holes corresponding to the keypad patterns and an opening corresponding to the display window.

9. The method according to claim 1, wherein the elastic layer in step f) has a bearing piece arranged thereon, and the bearing piece has a plurality of elastic bodies disposed thereon, each of which has a plunger.

10. A panel structure for an electronic device, comprising:
a three-dimensional panel, on which a keypad pattern and a display window are arranged;
a cladding layer, which is clad on the surface of the three-dimensional panel;
a supporting layer, which is clad on the inner wall surface of the three-dimensional panel; and
an elastic layer, on which a bearing piece is arranged, a plurality of elastic bodies being arranged on the bearing piece corresponding to a plurality of thorough holes, and each elastic body having a plunger disposed thereon.

11. The panel structure for electronic device according to claim 10, wherein the three-dimensional panel is made of material of transparent polycarbonate film and is formed as a rectangular body.

12. The panel structure for electronic device according to claim 10, wherein the keypad pattern comprises a plurality of key patterns of different forms, and the key pattern has plane patterns of character, numeral, or symbol arranged thereon.

13. The panel structure for electronic device according to claim 10, wherein the cladding layer is made of material of hard resin and the surface of the cladding layer has three-dimensional patterns of keypad, character, numeral, Braille, or texture line formed thereon.

14. The panel structure for electronic device according to claim 13, wherein the keypad comprises a plurality of keys, on the surface of which three-dimensional patterns of character, numeral, Braille, or texture line are formed.

15. The panel structure for electronic device according to claim 10, wherein the supporting layer is made of material of hard resin, and has a plurality of thorough holes and an opening disposed thereon.

16. The panel structure for electronic device according to claim 10, wherein the elastic layer is made of material of soft rubber.

17. The panel structure for electronic device according to claim 10, wherein a lighting layer is disposed under the elastic layer and the supporting layer, and the lighting layer is one kind of electroluminescence or light guide film.

18. The panel structure for electronic device according to claim 17, wherein an elastic piece layer having a piece body of thin film and a plurality of metallic domes arranged on the other side is disposed under the lighting layer.

19. The panel structure for electronic device according to claim 18, wherein a flexible printed circuit board is disposed under the metallic elastic piece layer.

20. The panel structure for electronic device according to claim 19, wherein the flexible printed circuit board is a circuit board having a plurality of electronic circuits and contact points.

* * * * *